United States Patent [19]

Guyer

[11] 4,093,552

[45] June 6, 1978

[54] FILTRATION APPARATUS

[75] Inventor: August Guyer, Zurich, Switzerland

[73] Assignee: Escher Wyss Limited, Zurich, Switzerland

[21] Appl. No.: 746,221

[22] Filed: Nov. 30, 1976

[30] Foreign Application Priority Data

Dec. 11, 1975 Switzerland ............... 016075/75

[51] Int. Cl.² ............................................. B01D 33/02
[52] U.S. Cl. ................................... 210/297; 210/298; 210/315
[58] Field of Search ............... 210/297, 298, 360 R, 210/360 A, 315

[56] References Cited

U.S. PATENT DOCUMENTS

| | | | |
|---|---|---|---|
| 1,217,207 | 2/1917 | North | 210/298 X |
| 1,262,146 | 4/1918 | Ward | 210/297 X |
| 2,670,849 | 3/1954 | Dunmire | 210/297 |
| 3,029,951 | 4/1962 | Cannon | 210/298 |

Primary Examiner—John Adee
Attorney, Agent, or Firm—Robert A. Ostmann

[57] ABSTRACT

Filtration apparatus comprises in a housing an annular filtration chamber into which there is admitted a suspension under pressure and which is formed between an external filtration surface in the form of a body of revolution and an internal filtration surface which is housed therein and is in the form of a body of revolution also; the annular filtration chamber has a suspension inlet at one of the chamber ends and has at its other and a product outlet; the filtration surfaces are connected in each case to a filtrate discharge collector; a rotating mixing-agitating device is arranged in the annular filtration chamber.

7 Claims, 6 Drawing Figures

Fig.3
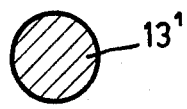
Fig.4
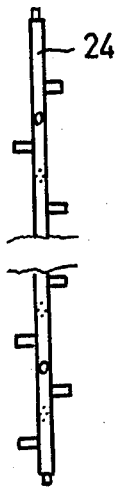
Fig.5
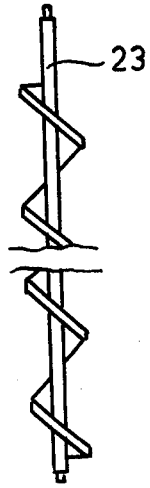
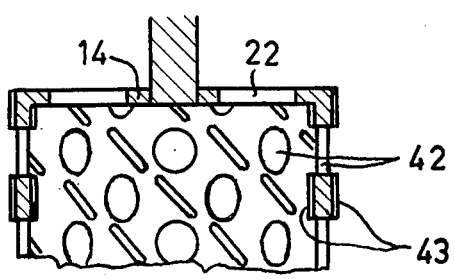
Fig.6

FILTRATION APPARATUS

BACKGROUND OF THE INVENTION

The invention relates to a filtration apparatus comprising in a housing an annular filtration chamber into which there is admitted a suspension under pressure and which is formed between an external filtration surface in the form of a body of revolution and an internal filtration surface which is nested therein and is also in the form of a body of revolution, the annular filtration chamber comprising at one of its ends a suspension inlet and at its other end an outlet for the product, and the filtration surfaces which are in the form of bodies of revolution are connected in each case to a filtrate discharge collector.

In filtration apparatus of this kind, the suspension under pressure which is to be processed is conducted by way of a suspension inlet into an annular filtration chamber. The liquid which is to be separated out passes through the filtration surfaces which are in the form of bodies of revolution and is taken away as a filtrate by means of a filtrate discharge collector connected with each of the filtration surfaces. The product which remains in the filtration chamber moves through the filtration chamber in the direction towards a product outlet, through which the product issues from the filtration apparatus. Thus the filtration apparatus operates continuously with a continual throughflow of suspension or product respectively between the filtration surfaces which form the filtration chamber.

But in the case of many suspensions which are processed a solid cake layer forms on the filtration surfaces and the known filtration apparatus is then not suitable for filtering a suspension of that kind.

SUMMARY OF THE INVENTION

It is an object of this invention to provide a filtration apparatus wherein the formation of a solid cake layer on the filtration surfaces is prevented.

In a filtration apparatus of the kind described initially, this object is achieved in that a rotating mixing-agitating device is arranged in the annular filtration chamber.

According to a preferred constructional form, the rotating mixing-agitating device in the filtration chamber comprises a plurality of bars which jointly form a grid of bars in the form of a body of revolution. By turning this bar grid in the filtration chamber the product is not only tangentially mixed and agitated in a turbulent fashion but shearing forces also occur as a result and act in a peripheral direction at the filtration surfaces, so that no cake layer can form on the filtration surfaces.

According to a further preferred constructional form, the rotating mixing-agitating device comprises a wall which is situated between the filtration surfaces and axially parallel thereto, the said wall forming a body of revolution and being perforated with holes. Advantageously this axially parallel wall is constructed as a rough tube, preferably with ribs arranged transversly to the direction of rotation, for conveying the product.

In this case in addition to the effect achieved previously, namely in addition to tangential mixing and agitating and over and above the shearing forces acting in the peripheral direction, shearing forces are additionally produced which act in the axial direction on the filtration surfaces.

BRIEF DESCRIPTION OF THE DRAWING

The subject of the present invention will be described in detail and explained hereinafter with reference to the drawings. In the drawings:

FIG. 3 shows various cross-sectional shapes for the bars of the mixing-agitating device, FIG. 4 and FIG. 5 each show a constructional form of the bars, and FIG. 6 shows a mixing-agitating device comprising a wall.

DESCRIPTION OF THE PREFERRED EMBODIMENTS

Figure 1:
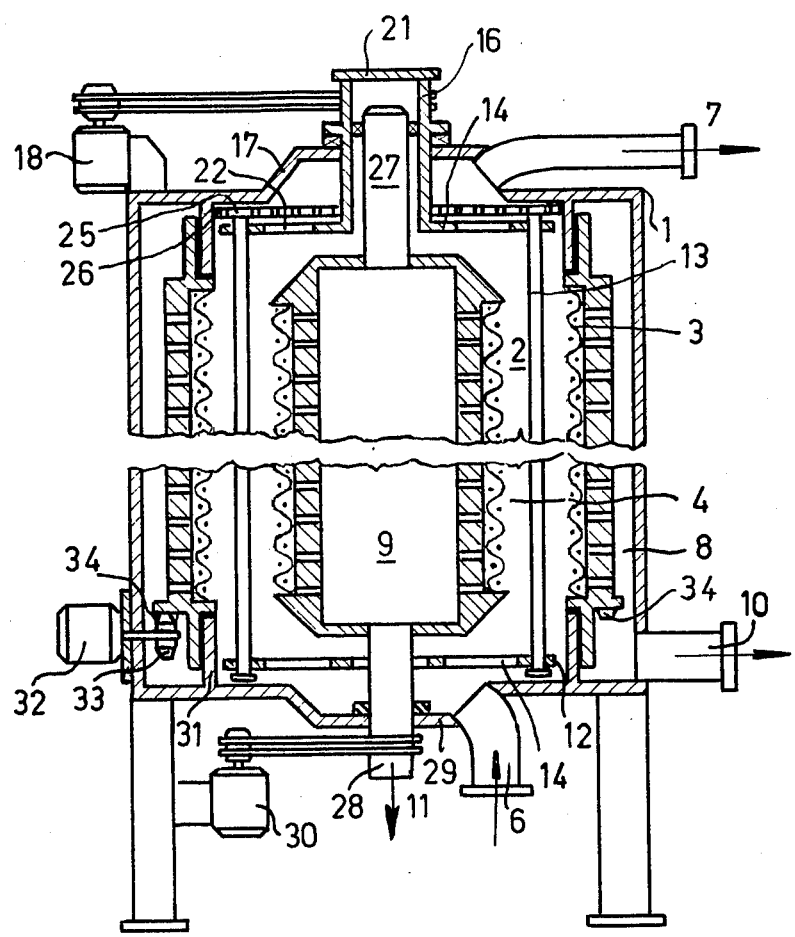
FIG. 1 shows a constructional example.

The filtration apparatus shown in FIG. 1 comprises within a housing 1 an annular filtration chamber 2 which is formed between an external filtration surface 3 in the form of a body of revolution and an internal filtration surface 4 which is nested therein and is in the form of a body of revolution. The filtration surfaces 3 and 4 are cylindrical and are arranged coaxially relatively to one another. A suspension to be processed is introduced into the filtration chamber 2 under pressure by way of a suspension inlet 6, and the product is taken away from the filtration chamber 2 by way of a product outlet 7. Arranged at this product outlet 7 is a valve which is not shown here but by means of which an operating pressure can be set up in the filtration chamber 2.

The liquid from the suspension penetrates through the filtration surfaces 3 and 4 into filtrate discharge collectors 8 and 9 one of which is connected with each said surface, and is discharged as filtrate through a duct 10 or 11 respectively. A rotating mixing-agitating device 12 is arranged in the annular filtration chamber 2. The mixing-agitating device 12 comprises a plurality of bars 13 which are distributed in a uniform arrangement in the peripheral direction of the filtration chamber 2. These bars are held in two rings 14 and together form a bar grid 15 which is in the form of a body of revolution, that is to say a cylindrical body. The upper ring 14 in FIG. 1 is arranged at a hollow shaft 16 which is mounted in sealingtight fashion and in such a manner as to be rotatable and axially non-displaceable in a cover part 17 of the housing 1, the said cover part closing the filtration chamber 2.

The hollow shaft 16 is rotated by means of a motor 18 which can rotate in both directions and whose rotational speed can be regulated. The space within the hollow shaft 16 is closed off from the exterior by means of a cover 21.

The bars 13 are straight, smooth bars which have a round cross-section. This cross-section is shown on a larger scale as $13^1$ in FIG. 3. This FIG. 3 also shows other possible cross-sectional shapes for the bars. Thus $13^2$ designates a square cross-section. $13^3$ and $13^4$ show shapes which have different hydraulic effects.

It would also be possible to make only a single bar 13 revolve in the annular filtration chamber 2. In that case the rings 14 could be reduced simply to arms which hold the single bar.

The bars 13 could also be constructed as conveying screws 23 as in FIG. 5 or as rake bars 24 as shown in FIG. 4. Such bars would then be held in the rings 14 so as to be capable of rotating about their axes. For turning the bars about their axes it is advantageous to provide a planetary drive with planet wheels 25 at the bars, cooperating with a stationary sun wheel 26.

The cylindrical filtration surfaces 3 and 4 are arranged to be capable of rotating in the housing 1 and are driven by means of a motor 30 and a motor 32 respectively.

Thus it is possible to bring them into motion or leave them stationary during filtration, as necessary.

Figure 2:
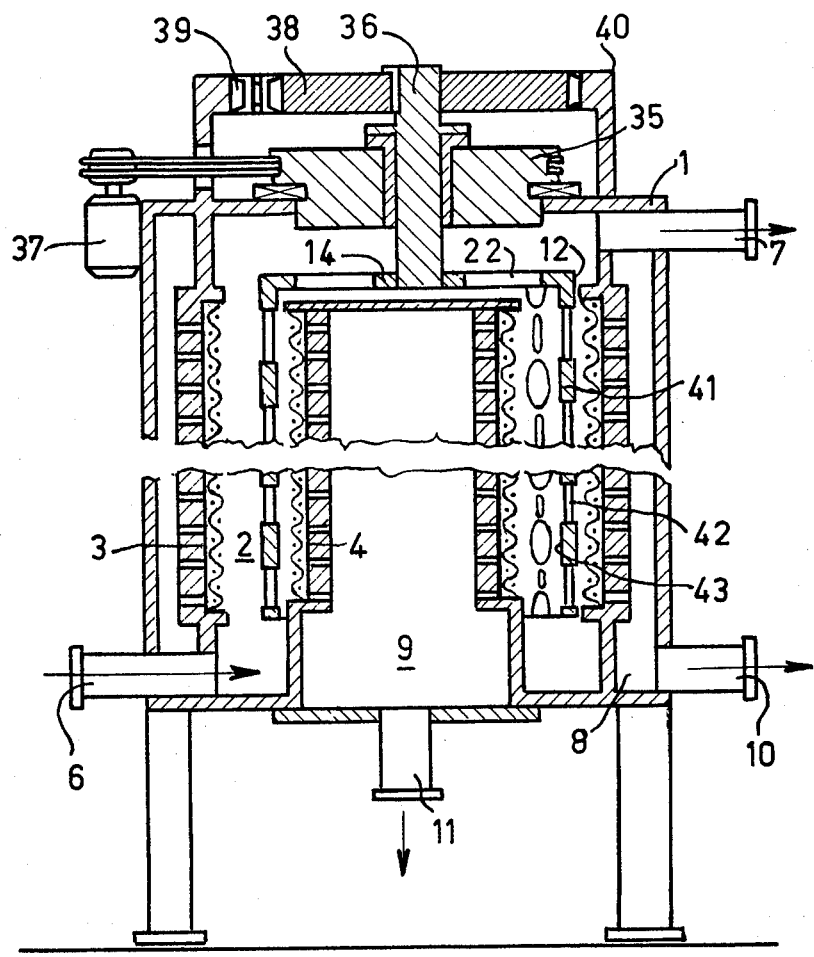
FIG. 2 shows another constructional example of a filtration apparatus, in vertical cross-section in each case.

In the filtration apparatus shown in FIG. 2 the mixing-agitating device 12 is arranged eccentrically relatively to the annular filtration chamber 2 and is constructed to be capable of revolving in planetary fashion. The filtration chamber 2 is closed with a disc 35 arranged concentrically with respect to the said chamber. The disc 35 is mounted to be capable of rotating but not of displacement in an axial direction in the housing 1, in sealing-tight manner. A shaft 36 of the mixing-agitating device 12 is mounted in the disc 35 eccentrically thereto in such a manner as to be capable of rotating and incapable of axial displacement, in sealing-tight fashion. In order to rotate the disc 35 there is provided a motor 37 which is capable of rotating in both directions and whose rotational speed can be regulated. A planetary gear is provided for turning the mixing-agitating device 12 about its axis. This planetary gear comprises a planet wheel 38 which is fixed on the shaft 36 of the mixing-agitating device and a stationary sun wheel 39.

The rotating mixing-agitating device 12 comprises a wall 41 which is in the form of a body of revolution, namely a cylinder, and extends between the filtration surfaces 3 and 4, axially parallel thereto. The wall 41 is provided with holes 42 so that the product can pass through the wall 41. For the same reason a ring 14 holding the wall 41 is also provided with holes 22.

The wall 41 extending axially parallel to the filtration chamber 2 is constructed as a tube which is rough on both sides and preferably the wall 41 comprises ribs 43 which extend transversely relatively to the peripheral direction. As FIG. 6 shows particularly clearly, the ribs extend in each case along an imaginary helix and thus help to move the product in the direction towards the product outlet 7.

The two filtration surfaces 3 and 4 are arranged in a stationary manner in the housing 1.

The filtration apparatus provided by the present invention can in principle operate in all positions in space. But the vertical situation shown in the drawings is one of the most space-saving positions.

It is also imaginable that only one of the surfaces 3 or 4 having the form of a body of revolution and bounding the annular filtration chamber 2 is formed as a filtration surface the other surface being impermeable.

I claim:
1. Apparatus for filtering a suspension under pressure comprising
    a. a housing containing an elongated, annular filtration chamber bounded by external and internal surfaces in the form of bodies of revolution,
    b. each of said surfaces being formed as a filtering member and being provided with a filtrate discharge collector;
    c. an inlet for introducing suspension under pressure to one end of said annular chamber and an axially spaced outlet for discharging filtered material from the opposite end of that chamber;
    d. means defining a permeable agitating partition of cylindrical form which is located in, and extends longitudinally of, the annular chamber; and
    e. drive means for rotating said partition,
    f. the partition being spaced radially from each of said surfaces so that, during operation, a body of suspension in a turbulent state forms between the partition and each surface and is effective to keep solids from accumulating on the adjacent surface.

2. Apparatus as defined in claim 1 in which said means defining a permeable partition comprises a plurality of circumferentially spaced bars.

3. Apparatus as defined in claim 2 in which each bar is mounted for rotation about its axis; and the drive means includes planetary gearing which serves to rotate the bars about their axes as the partition rotates.

4. Apparatus as defined in claim 1 in which said means defining a permeable partition comprises a perforated tube.

5. Apparatus as defined in claim 4 in which the tube is provided with inclined ribs on its inner and outer surfaces which serve to convey material in the annular chamber axially toward said outlet.

6. Apparatus as defined in claim 1 in which the permeable partition is arranged eccentrically within the annular chamber; and the drive means revolves the partition in planetary fashion.

7. Apparatus as defined in claim 1 in which at least one of said surfaces is mounted for rotation in the housing; and which includes drive means for rotating said rotatable surface.

* * * * *